(12) United States Patent
Van Herk

(10) Patent No.: US 10,075,558 B2
(45) Date of Patent: Sep. 11, 2018

(54) SYSTEM AND METHOD FOR AUTOMATICALLY INTEGRATING A DEVICE IN A NETWORKED SYSTEM

(75) Inventor: Robert Van Herk, Dordrecht (NL)

(73) Assignee: PHILIPS LIGHTING HOLDING B.V., Eindhoven (NL)

(*) Notice: Subject to any disclaimer, the term of this patent is extended or adjusted under 35 U.S.C. 154(b) by 280 days.

(21) Appl. No.: 13/133,457

(22) PCT Filed: Nov. 27, 2009

(86) PCT No.: PCT/IB2009/055376
§ 371 (c)(1),
(2), (4) Date: Jun. 8, 2011

(87) PCT Pub. No.: WO2010/067247
PCT Pub. Date: Jun. 17, 2010

(65) Prior Publication Data
US 2011/0241848 A1 Oct. 6, 2011

(30) Foreign Application Priority Data
Dec. 9, 2008 (EP) .................................. 08171020

(51) Int. Cl.
*G06F 9/4401* (2018.01)
*H04L 29/08* (2006.01)
(Continued)

(52) U.S. Cl.
CPC ............ *H04L 67/34* (2013.01); *G06F 9/4413* (2013.01); *H05B 37/0245* (2013.01);
(Continued)

(58) Field of Classification Search
CPC ........... G05B 2219/31121; G05B 2219/31129; G05B 2219/31132; G05B 2219/25101;
(Continued)

(56) References Cited

U.S. PATENT DOCUMENTS

| 6,528,954 B1 | 3/2003 | Lys et al. |
| 2004/0148368 A1 | 7/2004 | Reese et al. |

(Continued)

FOREIGN PATENT DOCUMENTS

| CN | 1695992 A | 11/2005 |
| JP | 065376 A | 1/1994 |

(Continued)

OTHER PUBLICATIONS

Sanneck et al., "Network Element Auto-configuration in a Managed Network", 2007, pp. 497-515.

*Primary Examiner* — Benyam Haile

(57) ABSTRACT

The invention relates to automatically integrating a device in a networked system so that a user does not have to set-up or configure the new device. A basic idea of the invention is to provide an automatic copying procedure of the functionality of a device of a networked system to a new device, which is integrated in the networked system. An embodiment of the invention provides a method for copying the functionality of a device (10; 12) of a networked system to a new device (14), comprising the automatically performed steps of:
detecting a new device (14) to be integrated in the networked system (S10),
determining a reference device (10; 12) of the networked system (S12; S13), and
copying the functionality of the reference device to the new device (S14).

4 Claims, 3 Drawing Sheets

(51) Int. Cl.
*H05B 37/02* (2006.01)
*G06F 13/10* (2006.01)
*G06F 9/445* (2018.01)
*H04L 12/24* (2006.01)

(52) U.S. Cl.
CPC .............. *G05B 2219/25101* (2013.01); *G05B 2219/25428* (2013.01); *G05B 2219/31121* (2013.01); *G06F 9/44505* (2013.01); *G06F 13/102* (2013.01); *H04L 41/12* (2013.01); *H04N 2201/0036* (2013.01)

(58) Field of Classification Search
CPC ...... G06F 13/36; G06F 9/4411; G06F 9/4413; H04L 41/084; H04L 41/0843; H04L 41/0846; H04L 41/0803
USPC .......................................... 709/220, 221, 222
See application file for complete search history.

(56) References Cited

FOREIGN PATENT DOCUMENTS

| | | |
|---|---|---|
| JP | H06005376 A | 1/1994 |
| WO | 0213490 A2 | 2/2002 |
| WO | 2006111930 A2 | 10/2006 |
| WO | 2006111934 A1 | 10/2006 |
| WO | 2007095740 A1 | 8/2007 |
| WO | 2007125477 A2 | 11/2007 |
| WO | 2007132382 A2 | 11/2007 |
| WO | 2008001267 A2 | 1/2008 |
| WO | 2008032236 A1 | 3/2008 |
| WO | 2008059411 A1 | 5/2008 |
| WO | 2008068693 A1 | 6/2008 |

\* cited by examiner

SYSTEM AND METHOD FOR AUTOMATICALLY INTEGRATING A DEVICE IN A NETWORKED SYSTEM

FIELD OF THE INVENTION

The invention relates to automatically integrating a device such as a lamp in a networked system such as a networked lighting system so that a user does not have to set-up or configure the new device or lamp, respectively.

BACKGROUND OF THE INVENTION

Currently, in most lighting environments, separate light units, which have easy one-to-one connections to light switches, are applied. These environments do not allow a comfortable and centralized control, for example with remote control units, as well as an easy rendering of lighting atmospheres. However, in the foreseeable future, this will change, because networked lighting systems will become more and more widespread, which allow better solutions for energy saving, lighting atmosphere rendering, wireless remote control, and so on. Although lighting systems are more powerful than separate light units, they are also more complex, for example with regard to set up and configuration of lamps. An example of a complex lighting unit for the home use is the LivingColors™ lamp of the Applicant. The LivingColors™ lamp comprises a radio remote control, which enables a user to comfortably set up the lighting color and intensity, particularly to select a preferred color from a range of colors. The user may also operate several LivingColors™ forming a lighting system at home and also control several lamps with one remote control.

WO2008/068693A1 relates to replacing a device in a network like a lighting control system, particularly a wireless network. For hot replacement of a device, operational data, defining an actual functionality, of the device are stored in storage means. After a physical replacement of the device, the stored data are down load to the new device. Thus, a quick and easy replacement of an existing device of the network is possible.

SUMMARY OF THE INVENTION

It is an object of the invention to provide a method and controller, which allow an easy integration of a new device in a networked system, particularly without requiring any user interaction, or merely requiring a minimum of user interaction such as connecting the new device to the mains, and to switch it on.

The object is solved by the subject matter of the independent claims. Further embodiments are shown by the dependent claims.

A basic idea of the invention is to provide a kind of automatic commissioning process for new devices such as lamps, which are integrated in a lighting system. Particularly, the invention provides an automatic copying procedure of the functionality of a lamp of a lighting system to a new lamp, which is integrated in the lighting system. The new device is in contrast to WO2008/068693A1 not a replacement for another device, but is added to the networked system as further device. Therefore, not only replicated data are copied to the new device, but a reference device is determined, which for example best matches the new lamp in its behavior by having capabilities similar to the capabilities of the new device, and its functionality is copied to the new device, so that the new device is immediately operable without the need of any user interaction. The invention is particularly applicable in networked lighting systems in order to make commissioning of the lamps of the lighting system much easier and the integrating of new lamps in the lighting system much more comfortable.

An embodiment of the invention provides a method for automatically integrating a device in a networked system, comprising the automatically performed steps of:
  detecting a new device to be integrated in the networked system,
  determining a reference device of the networked system, and
  copying the functionality of the reference device to the new device.

The functionality may for example comprise a certain state of the reference device, defined for example by settings such as color and intensity settings of a lamp as reference device so that a user is not required to set-up the new lamp or device. Also, the functionality may comprise a certain behavior of the reference lamp, defined for example by light effects, which may be created by the reference lamp or device. Thus, the new device may be fully integrated in the networked system without the need to be manually adjusted by a user and may immediately after the integrating behave like an already integrated device.

In a further embodiment of the invention,
  the step of detecting a new device to be integrated in the networked system may further comprise determining the capabilities of the new device, and
  the step of determining a reference device of the networked system may comprise determining a reference device of the networked system with capabilities similar to the capabilities of the new device. For example, when a new lamp should be integrated in a networked lighting system, the method may automatically detect that the new lamp is able to create a light within a certain color range. Then, the method may determine a lamp of the networked lighting system, for example an existing and operated lamp or a former lamp of the networked lighting system, which is able to create a light within a color range, which either is identical with the color range of the light, which may be created with the new lamp, or comprises the color range of the light of the new lamp. The determining of a reference device of the networked system with capabilities similar to the capabilities of the new device is a kind of matching of capabilities and may not only comprise in case of lamps as devices of a networked lighting system the color range of created light, but a couple of lighting capabilities such as intensity and light effects, which may be created, such as dynamic light effects.

Furthermore, an embodiment of the invention provides that
  the step of determining a reference device of the networked system may comprise determining a device of the networked system, which was disconnected from the networked system, and may further comprise determining the capabilities of the disconnected device. This allows to quickly and simply replacing a device of the networked system without requiring adjusting the replacement device to work as the replaced device. Also, broken devices may be easily and quickly replaced with this embodiment of the inventive method.

In a further embodiment of the invention, the step of determining a device of the networked system, which was disconnected from the networked system, may comprise retrieving the disconnected device's capabilities from a storage for capabilities of disconnected devices. For example, the networked system may register any device in the storage together with its capabilities. Also, the networked system may register in the storage, when a device is removed from the networked system, particularly disconnected or broken. "Disconnected" means to remove the device from the system such as removing a device from a network of devices. The stored disconnected devices' data may later be used for adding new devices to the system and simplify the replacement of disconnected devices with new devices. The order of disconnecting devices may be also stored. Thus, if many devices are disconnected and then later new devices are added, this stored or another particular order may be used for the determining of a matching or similar device. For instance, a first device to be added can be matched against the oldest of the removed or disconnected devices, which are stored. Or the first device to be added can be matched against the last removed devices. Multiple strategies for matching a new device with a disconnected device may be applied, in order to best meet user requirements and to obtain a more sensible behavior of the method according to the invention when replacing many devices at once.

Another embodiment of the invention provides that the retrieving of the disconnected devices' capabilities from a storage for capabilities of disconnected devices may comprise determining a reference device of the networked system with capabilities similar to the capabilities of the new device from the stored disconnected devices. This may be accomplished for example by retrieving a device among the stored disconnected devices, which may have for example similar capabilities as the new devices, instead of for example simply loading the first dataset of a disconnected device from the storage and to use the capabilities of this dataset for the new device, which may result in that the new device does not use its full functionality.

According to a further embodiment of the invention, a computer program may be provided, which enables a processor to carry out the above method according to the invention.

According to a further embodiment of the invention, a record carrier storing a computer program according to the invention may be provided, for example a CD-ROM, a DVD, a memory card, a diskette, internet memory device or a similar data carrier suitable to store the computer program for optical or electronic access.

A further embodiment of the invention provides a computer programmed to perform a method according to the invention such as a PC (Personal Computer) or even a device with an integrated computer or controller, which may be configured as controller of the networked system.

Another embodiment of the invention provides a networked system controller for integrating a device to a networked system, wherein the controller is adapted for
  detecting a new device to be integrated in the networked system,
  determining a reference device of the networked system, and
  copying the functionality of the reference device to the new device.

According to an embodiment of the invention, the controller may be further adapted to perform a method of the invention and as described above.

In a yet further embodiment of the invention, the controller may be embodied as a remote controller for a networked system and may comprise a wireless communication unit being adapted to wirelessly control devices of the networked system.

These and other aspects of the invention will be apparent from and elucidated with reference to the embodiments described hereinafter.

The invention will be described in more detail hereinafter with reference to exemplary embodiments. However, the invention is not limited to these exemplary embodiments.

DETAILED DESCRIPTION OF EMBODIMENTS

Figure 1:
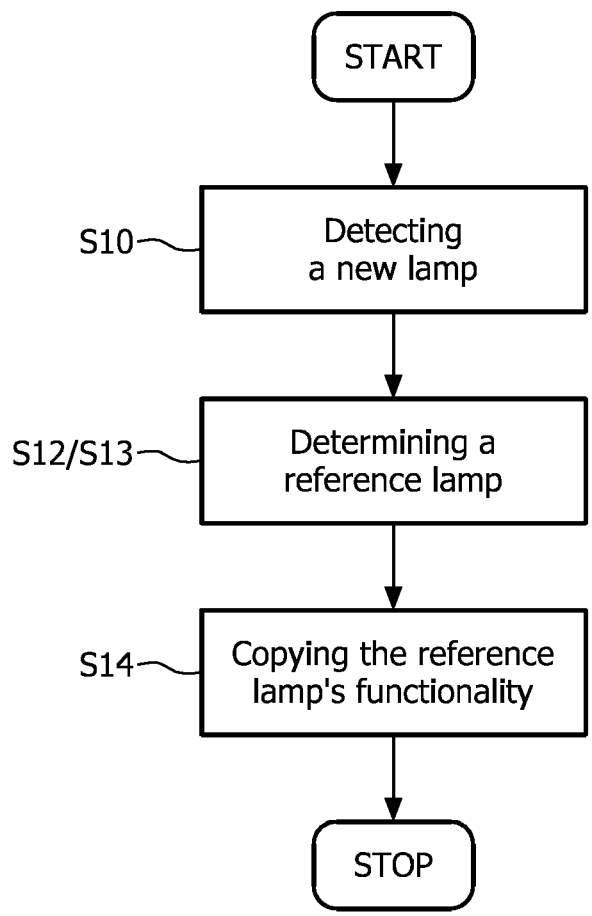
FIG. 1 shows a flow chart of an embodiment of the method for copying the functionality of a lamp of a lighting system to a new lamp according to the invention.

In the following, functionally similar or identical elements may have the same reference numerals. The invention is now explained by means of a networked lighting system as an example of a networked system. Lamps or light units of this networked lighting system are devices. However, the invention is not restricted to be applied to networked lighting systems, but can be applied to nay kind of networked system such as a networked home or office control system or the like. Also, in the following description, the terms "lamp" and "light unit" are used as synonyms describing the same technical means. If in the following description, the term "lighting system" is used, a networked lighting system as an embodiment of a networked system in the context of the present invention is meant.

Modern lighting systems allow to adjust and set-up different parameters of lamps, such as lighting colors and intensities and light effects. However, the configuration and set-up of a new lamp, which is integrated in a lighting system, may be time consuming and tedious due to the usually large number of parameters, which can be adjusted by the user.

The present invention now allows a user to quickly integrate a new lamp in a lighting system without requiring any adjustments. The process for integrating the new lamp, which is performed according to the invention, is explained in the following with reference to FIG. 1 showing a flow chart of the software implementing the inventive method for integrating the lamp.

Figure 2:
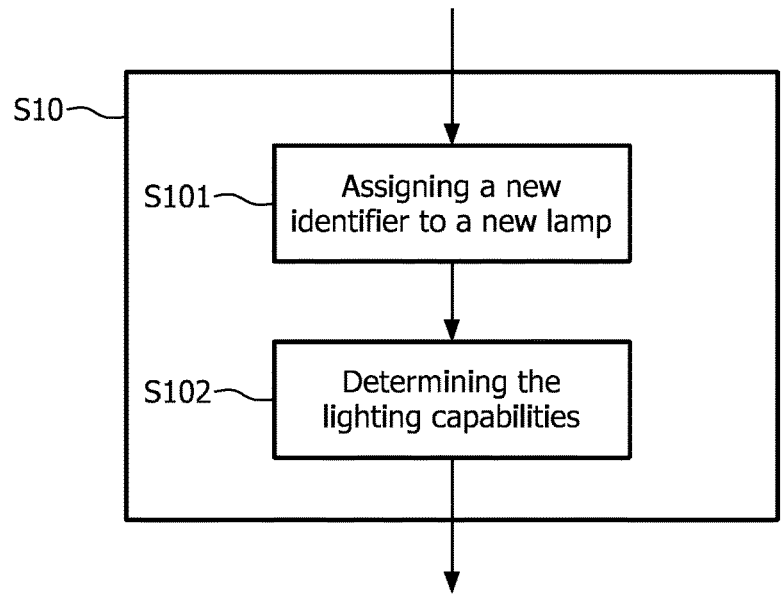
FIG. 2 shows an embodiment of step S10 of the flow chart shown in FIG. 1.

In a first step S10, a new lamp is detected by the lighting system. For example, when a new LivingColors™ lamp is to be integrated in a lighting system consisting of several LivingColors™ lamps, the new lamp is automatically assigned a new identifier, refer to sub step S101 of step S10 shown in FIG. 2, which represents step S10 in detail. This assignment of the new identifier may be preformed by a wireless remote controller of the lighting system, when it receives a wireless signal from the new lamp, which may comprise an unique network address of the new lamp such as a kind of MAC address. However, it should be noted that often addresses are fixed in devices and set in the factory.

Thus, this step is only required when a lamp does not have any address. In a following sub step S102 of the step S10 (FIG. 2), the wireless remote controller may request the lighting capabilities of the new lamp, such as the adjustable range colors, lighting intensities, light effects and the like.

In a second step S12/S13, a reference lamp of the lighting system is determined. The determining of the reference lamp serves to locate a lamp of the lighting system, which has lighting capabilities, which are similar to the lighting capabilities of the new lamp. Two different methods for determining the reference lamp are provided according to the invention and outlined in FIGS. 3 and 4.

Figure 3:
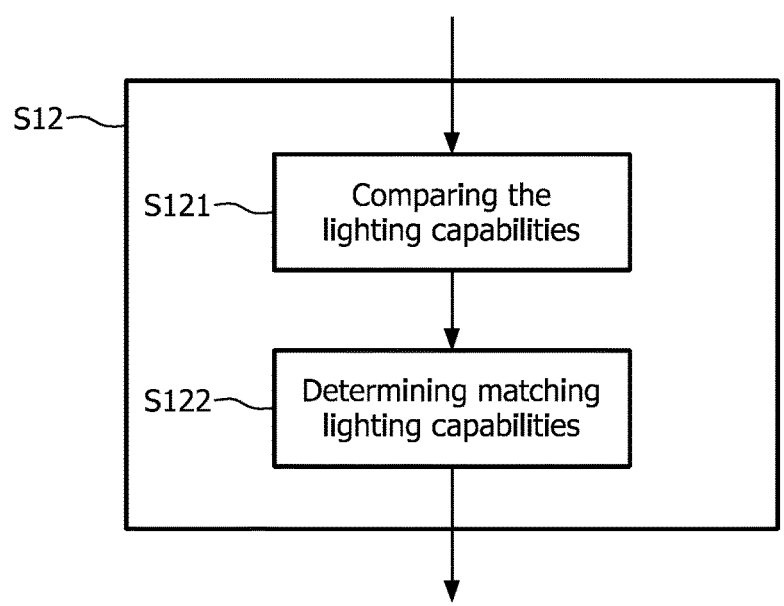
FIG. 3 shows an embodiment of step S12 of the flow chart shown in FIG. 1.

The first method as shown in FIG. 3 and designated with S12 comprises the following sub steps: in sub step S121, the lighting capabilities of the new lamp as requested in step S102 are compared with the lighting capabilities of the lamps, which are already integrated in the lighting system. This comparison process is not a simple comparison of two values, but a more complex process for retrieving the lamp with lighting capabilities, which are closest to the lighting capabilities of the new lamp. Different aspects may influence the comparison process: one aspect is the current light settings of the lamps of the system and the available light settings of the new lamp. Another aspect is the light effects created by the lamps of the system and the capability to create light effects by the new lamp. A further aspect may be for example the power consumption of the lamps of the lighting system. In the following sub step S122, one lamp of the lighting system with similar lighting capabilities is determined as reference lamp for the new lamp based on the result of the comparison process of step S121. Briefly summarized, a new lamp is configured such that it behaves like an existing lamp of the lighting system, which best matches the lighting capabilities of the new lamp, for example which has the most similarities in its lighting capabilities with the new lamps. For example, when the new lamp is able to render orange light, and one lamp of the lighting system is configured to create orange light, the later lamp is determined to be the reference lamp for the new lamp, and its settings to create orange light are copied to the new lamp so that it immediately creates orange light after the integration. Thus, a user sees sensible default behavior for the new lamp integrated in the lighting system.

Figure 4:
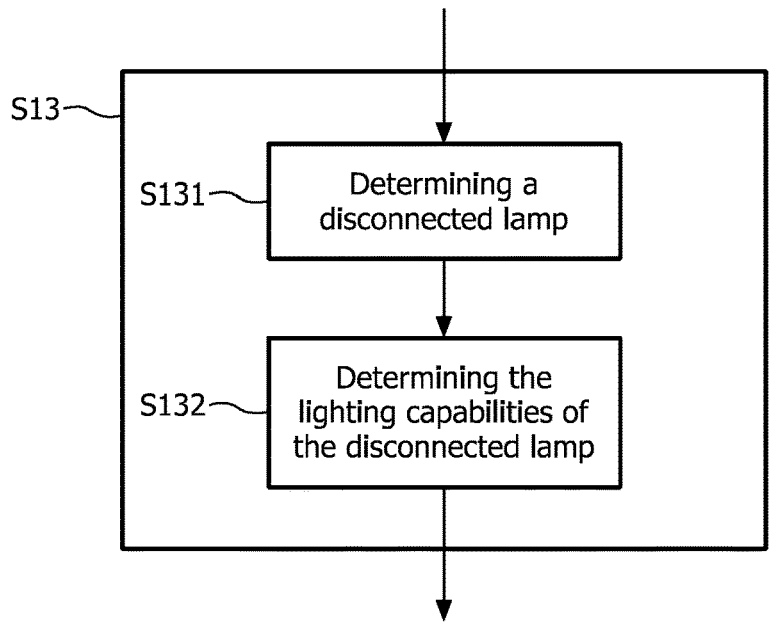
FIG. 4 shows an embodiment of step S13 of the flow chart shown in FIG. 1.

A second method for determining the reference lamp is shown in FIG. 4 and designated with S13: in a first sub step S131, a lamp, which was disconnected from the lighting system, is determined. The disconnected lamp may be for example a removed lamp or a broken lamp. Upon disconnecting the lamp, its lighting capabilities including its settings and configuration parameters were stored in a storage for disconnected lamps together with its identifier in the lighting system. The lighting capabilities can be also stored before disconnecting a lamp, for example somewhere during the lifetime of the lamp in the storage for disconnected lamps, and when the lamp is disconnected, a flag can be set in the storage so that it is clear which lamps are really disconnected. Next, the process of determining a reference lamp according to the second method is explained in detail. For example, if a lamp, which renders green light and has an identifier 3 in a lighting system, is disconnected, for instance by separating it from the lighting system or by switching it off, the settings for rendering green light and the identifier 3 is stored in the storage of disconnected lamps. In the sub step S131, several strategies for determining a lamp may be applied. For example, the lamp, which was disconnected last, may be determined. Also, a lamp may be retrieved among the disconnected lamps, which has lighting capabilities, which are similar to the lighting capabilities of a new lamp best among all disconnected lamps, which are stored in the storage. In a next sub step S132, the lighting capabilities of the determined disconnected lamp are determined. For example, when the disconnected lamp with identifier 3 was determined in sub step 131, its settings rendering green light may be load from the storage of disconnected lamps. Alternatively, the lighting capabilities of a disconnected lamp, which best matches the new lamp, may be determined.

Now, coming back to FIG. 1, the process continues with step S14: in this step, the functionality of the determined reference lamp is copied to the new lamp in order to integrate the new lamp completely in the lighting system. The functionality may be transmitted to the new lamp via a wireless communication connection for example controlled by a wireless remote control of the lighting system.

Figure 5:
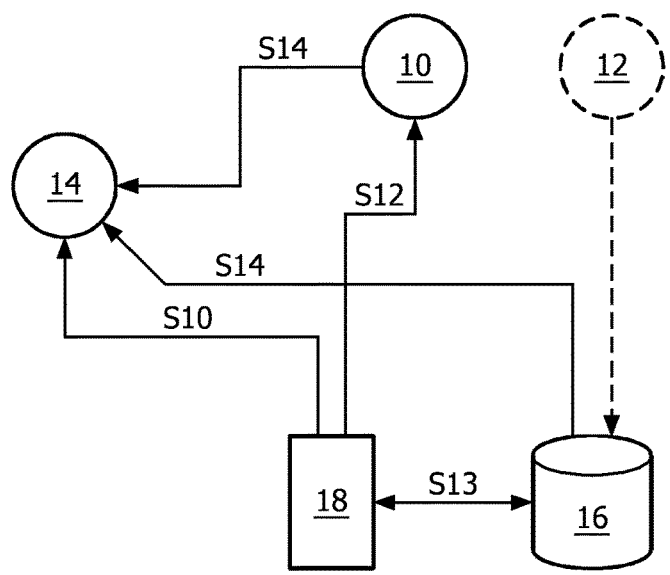
FIG. 5 shows an embodiment of a lighting system, to which a new lamp is added with the method according to the invention.

FIG. 5 demonstrates the process of integration of a new lamp in a lighting system with a wireless remote control such as the remote control of the LivingColors™ lamp: The new lamp to be integrated is designated with the reference numeral 14. Reference numeral 10 designates an existing lamp of the lighting system. Reference numeral 12 designates a lamp disconnected from the lighting system. The lighting capabilities of this lamp 12 were stored in a storage 16 for disconnected lamps upon disconnection of the lamp 12. The process of integration is now performed according to the invention is follows: When the new lamp 14 is switched on, it is wirelessly detected by the wireless remote control 18 of the lighting system (step S10). The remote control 18 then automatically initiates the integration process without any user interaction. This is performed by determining lamp 10 as reference lamp (step S12), and by directly copying the lighting capabilities of lamp 10 to the new lamp 14 (step S14). Alternatively, the remote controller 18 may determine the disconnected lamp 12 from the storage 16 as reference lamp (step S13), and the lighting capabilities of this disconnected lamp 12 may copied from the storage 16 to the new lamp 14 (step S14).

As described above, the invention particularly allows solving two problems of complex lighting systems:

1. When a user adds a new lamp to the lighting system, the lighting system automatically knows how to use it.
2. When a user replaces a (broken or disconnected) lamp with a new lamp, it behaves same way as the old lamp was used. For instance, if the old lamp was rendering orange light under the table in a specific atmosphere, the user would want the new lamp to perform the same task. This is especially hard in a system in which the connectivity is wireless, as there is no (easy) way to find out where new lamps are placed: the system does not know that the new lamp is put under the table.

As explained above, the invention proposes a way to solve both problems, without requiring the user to perform any further steps than establishing the connectivity for the new light unit to the light system, which typically goes automatically as soon as the light unit is powered.

Problem 1 may be solved according to the invention that upon integrating a new lamp in a lighting system, it is looked in the system whether there is a light unit with the same specs already in use. For instance, in a lighting system consisting of several LivingColors™ lamps, there may be a new LivingColors™ lamp attached to the system. The LivingColors™ lamp will have some address or identifier by the lighting system, for example identifier 1. It will have some functionality, such as rendering orange light in some atmosphere. Now, a new LivingColors™ lamp is added to the system. It will be given a fresh identifier by the system, let's say identifier 2. The system sees that light unit 2 has capabilities similar to light unit 1, and therefore will copy the functionality of light unit 1 (i.e. rendering orange light) to light unit 2. Of course, when a different kind of new lamp comes online (e.g. a lamp capable of rendering cold and warm white light) the system will try to match it to an existing light unit with these capabilities, for example retrieving an existing light unit with similar lighting capabilities. Thus, the new lamp is used in exactly the same way as an old lamp with the same specs was used. In this way, the user sees sensible default behavior for the new light source.

For problem 2 the system may remember the functionality performed for example by the last light unit that went offline. The first new lamp that goes online may be controlled in exactly the same way as the last lamp that went offline was. For instance, there may be a LivingColors™ lamp attached to the system. The LivingColors™ lamp will be given some address or identifier by the lighting system. Let's say it has identifier 1. When it is disconnected, the system remembers that the last light unit that went offline was light unit with identifier 1. It will also remember the functionality that light unit 1 had. Now a new light unit is attached. It will get an identifier, e.g. 2. The system will now try to use 2 as if it were 1. This means that it will look up the functionality of 1 (i.e. rendering orange light) and apply that to 2. In this way, as long as the user only replaces one lamp at a time, there is no extra commissioning step required when replacing light units. This can be augmented for allowing the user to replace many light sources at one time. Hereto, the system may remember the order in which the lamps go offline and add their functionality into a queue q. Whenever a lamp goes online, q will be dequeued. The new lamp will be matched to this functionality. In this way, the user can replace many lamps at the same time, as long as brings the new lamps online in the same order as in which the old lamps where brought offline. (Some users may find it nicer to do this in reverse order, in which case a stack may be used). Additionally, the system may remember the specs of each light unit that goes offline. For instance, it may remember that a LivingColors™ lamp (rendering the orange color under the table) went offline with identifier 1, and a light capable of rendering cold and warm white light went offline with identifier 2. Whenever a new lamp capable of rendering cold and warm white light goes online, the system will match these specs to the lamp that used to have identifier 2. Whenever a new lamp capable of rendering color goes online, the system will match these specs to the lamp that used to have identifier 1.

The invention can be applied in any lighting system with a plurality of light sources, for example in lighting systems in homes, shops and office applications. It is particularly suitable for the easy set-up of light sources and lighting commissioning, especially by end-users in the home environment.

At least some of the functionality of the invention may be performed by hard- or software. In case of an implementation in software, a single or multiple standard microprocessors or microcontrollers may be used to process a single or multiple algorithms implementing the invention.

It should be noted that the word "comprise" does not exclude other elements or steps, and that the word "a" or "an" does not exclude a plurality. Furthermore, any reference signs in the claims shall not be construed as limiting the scope of the invention.

The invention claimed is:

1. A method for automatically integrating a lighting device in a networked lighting system, the method comprising:
    detecting a new lighting device to be integrated in the networked lighting system,
    determining a reference lighting device of the networked lighting system by comparing lighting capabilities of the new lighting device with lighting devices in the networked lighting system, the reference lighting device having lighting capabilities similar to that of the new lighting device, and
    copying functionality of the reference lighting device to the new lighting device.

2. The method of claim 1, wherein detecting the new lighting device to be integrated in the networked system comprises determining the lighting capabilities of the new lighting device.

3. A networked system remote controller for integrating a lighting device into a networked lighting system, wherein the controller comprises:
    a wireless communication unit configured to wirelessly control lighting devices of the networked lighting system,
    wherein the wireless communication unit is configured to:
        detect a new lighting device to be integrated in the networked lighting system,
        determine a reference lighting device of the networked lighting system by comparing lighting capabilities of the new lighting device with lighting devices in the networked lighting system, the reference lighting device having lighting capabilities similar to that of the new lighting device, and
        copy the functionality of the reference lighting device to the new lighting device.

4. The networked system remote controller as claimed in claim 3, wherein the lighting capabilities of the new lighting device are determined.

* * * * *